Jan. 20, 1942.          G. FORTON          2,270,583
SOUND INSULATED DRIVE CONNECTION
Filed May 27, 1940

Inventor
George Forton

By
J. S. Murray
Attorney

Patented Jan. 20, 1942

2,270,583

UNITED STATES PATENT OFFICE 2,270,583

SOUND INSULATED DRIVE CONNECTION

George Forton, Detroit, Mich.

Application May 27, 1940, Serial No. 337,355

2 Claims. (Cl. 64—11)

This invention relates to sound-insulated drive connections and particularly rotary drive connections.

An object of the invention is to provide a drive connection between a shaft and a propeller or other driven member and to so employ sound-insulating packing as to largely absorb vibration induced by torque, clamping, and end thrust stresses.

Another object is to employ bolts or the like in mounting a driven member upon a shaft, to fully safeguard such bolts against torque stresses, and to transmit such stresses through sound-insulating material.

These and various other objects the invention attains by the construction hereinafter described and illustrated in the accompanying drawing, wherein.

Figure 1:
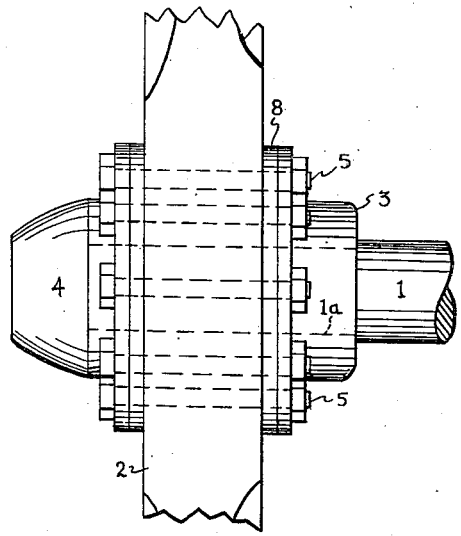
Fig. 1 is a view in side elevation of one embodiment of the improved drive connection.
Figure 2:
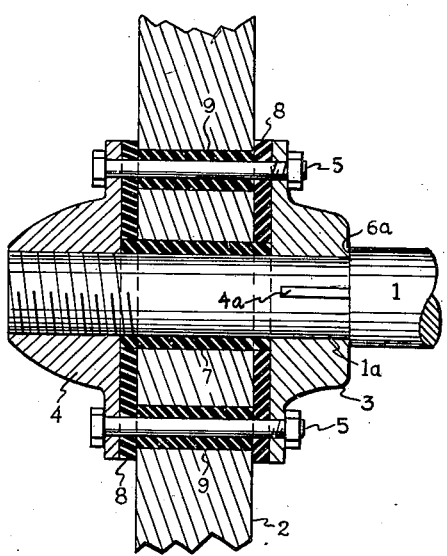
Fig. 2 is an axial sectional view of the same.

Describing the construction more in detail and referring first to the disclosure of the Figs. 1 and 2, the reference character 1 designates a drive shaft having a reduced end portion 1a to receive the hub of a propeller or other driven member 2. Said hub comprises inner and outer flanged collars 3 and 4 both attached to the driven member by a plurality of bolts 5. The collar 3 is keyed at 4a to the end portion 1a and the free extremity of such end portion is threaded for engagement by collar 4, which clamps the hub 3, 4 against an annular shoulder 6a formed at the juncture of said end portion with the shaft proper. It will be understood that the bolts 5 are not applied until the parts are properly positioned on the shaft.

To minimize the transmission of sound and other vibration from the driven member to the shaft and vice versa, there is provided a suitable non-metallic packing such as rubber or some strong flexible fabric so disposed as to effect transmission of all stresses. Such packing comprises a sleeve 7 interposed between the shaft portion 1a and the member 2, a pair of annular disks 8 interposed between the collars 3 and 4 and said member, and a set of sleeves 9 individually receiving the bolts 5 as they extend through said member. Clamping and end thrust driving stresses are transmitted through the disks 8, and torque stresses through the sleeves 7 and 9. Thus metal-to-metal contact is completely avoided between the member 2 and the parts mounting it in driven relation to the shaft.

Figure 3:
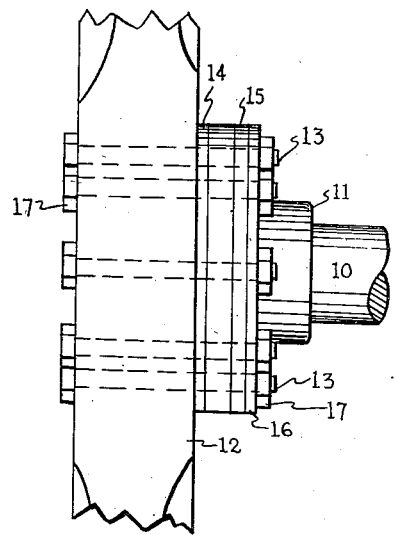
Fig. 3 is a view in side elevation disclosing a modified drive connection.
Figure 4:
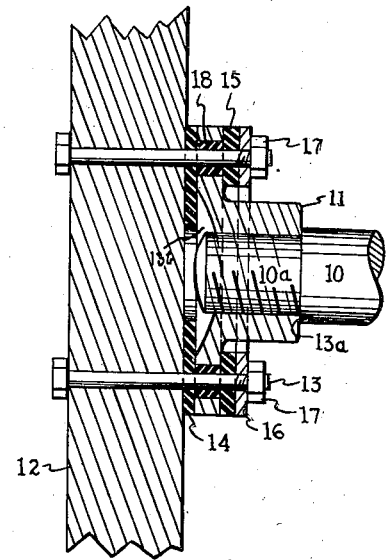
Fig. 4 is an axial sectional view of the same.

In the modification shown by Figs. 3 and 4, the reduced end portion 10a of a shaft 10 is screw-threaded for engagement by the metallic hub 11 of a propeller or other driven member 12, said hub comprising a single collar secured to the inner side of the member 12 by a set of bolts 13 and having a thrust bearing against an annular shoulder 13a of the shaft. To prevent unscrewing of the member 12, it is restrained from rotation on the shaft by a key 13b set diametrically into the shaft extremity and into the collar 11. The driving, clamping, and end thrust stresses are transmitted through a packing formed of flexible non-metallic material as has been described. This packing comprises a disk 14 interposed between the hub and the driven member, an annulus 15, interposed between the hub and a clamping ring 16 seating nuts 17 carried by the bolts 13, and bushings 18 surrounding the bolts as they extend through the hub.

In each of the described constructions, in establishing a desired drive the transmission of vibration and resultant noise is greatly reduced as compared to prior drive connections and for many purposes the described packing substantially eliminates transmitted noise. The construction is particularly applicable to the driving of propellers of aircraft and watercraft, and has numerous other applications.

The invention is presented as including all such modifications and changes as come within the scope of the following claims.

What I claim is:

1. A drive connection comprising a drive shaft having a reduced end portion and an annular shoulder at the juncture of such portion with the main body of the shaft, a drive-transmitting collar mounted on said reduced portion against said shoulder, in driven engagement with said portion, a driven member mounted on said reduced portion and laterally adjoined to said collar, bolts attaching the collar to the driven member, packing sleeves engaging the bolts and sound-insulating them from the driven member, and a sound insulating packing interposed between the collar and the driven member.

2. A drive connection comprising a drive shaft having a reduced end portion and an annular shoulder at the juncture of such portion with the main body of the shaft, a drive-transmitting collar keyed on said reduced portion and abutting said shoulder, a second drive transmitting collar threaded on said reduced portion and spaced from the first mentioned collar, a driven member clamped between the two collars by the threaded collar and clamping the keyed collar against said shoulder, and means positively interconnecting the collars and driven member for transmitting a drive.

GEORGE FORTON.